No. 647,118. Patented Apr. 10, 1900.
H. SCHNEPP.
VEHICLE TIRE.
(Application filed Dec. 20, 1898.)
(No Model.) 2 Sheets—Sheet 1.
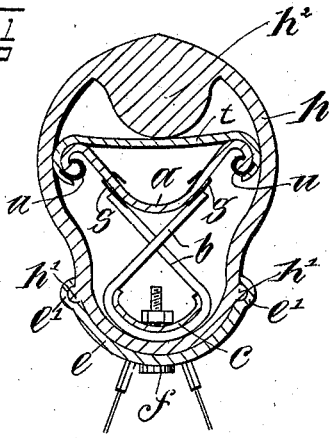
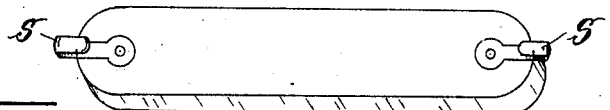
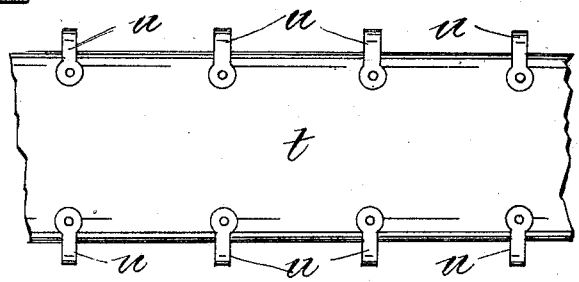
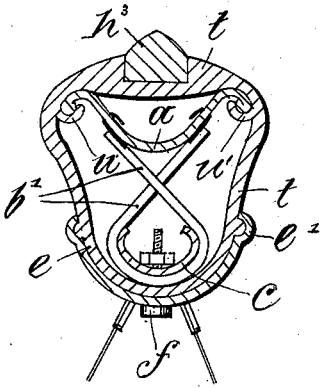
Witnesses:
Inventor:

No. 647,118. Patented Apr. 10, 1900.
H. SCHNEPP.
VEHICLE TIRE.
(Application filed Dec. 20, 1898.)
(No Model.) 2 Sheets—Sheet 2.
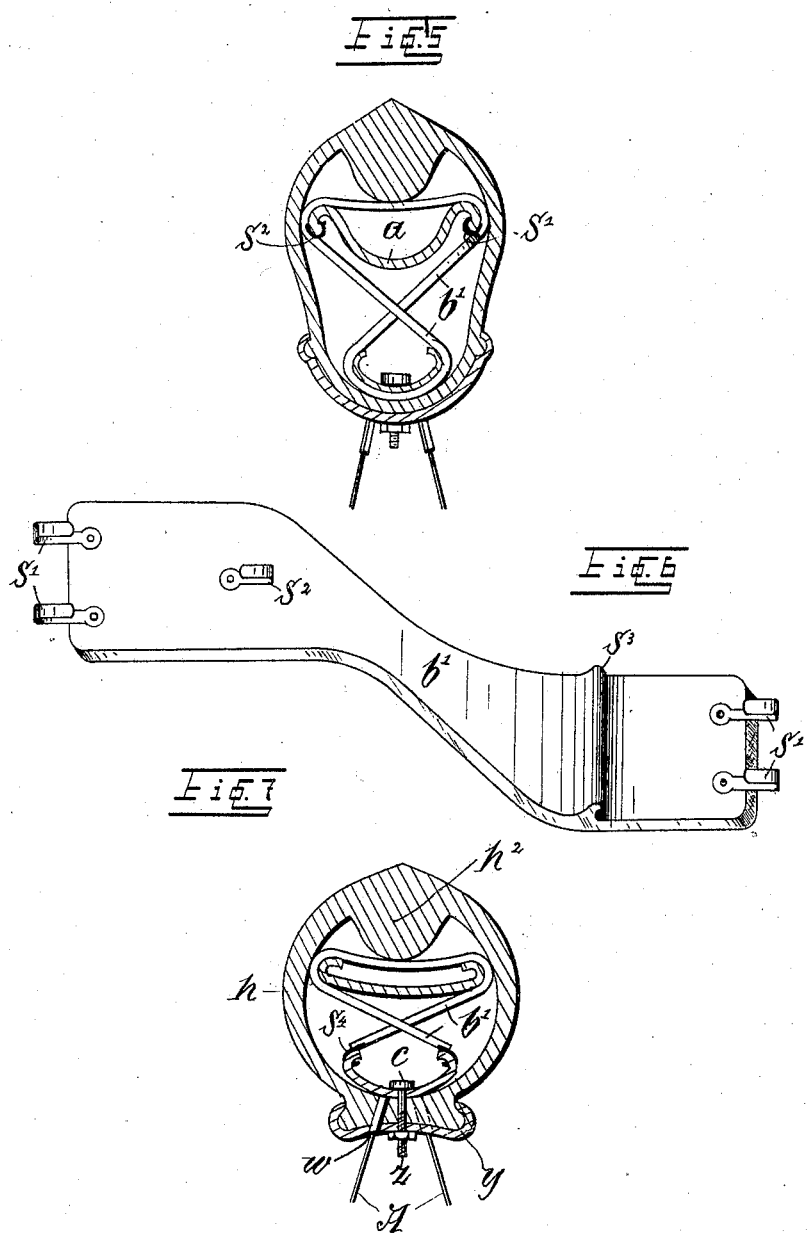
Witnesses: Inventor:

UNITED STATES PATENT OFFICE.

HANS SCHNEPP, OF AUGSBURG, GERMANY.

VEHICLE-TIRE.

SPECIFICATION forming part of Letters Patent No. 647,118, dated April 10, 1900.

Application filed December 20, 1898. Serial No. 699,878. (No model.)

*To all whom it may concern:*

Be it known that I, HANS SCHNEPP, technician, a subject of the King of Bavaria, residing at No. 54 Göggingerstrasse, Augsburg, Kingdom of Bavaria, Germany, have invented new and useful Improvements in Vehicle-Tires, of which the following is a specification.

The present invention relates to improvements in elastic tires for the wheels of cycles and other vehicles, and more particularly to improvements in the type of single-tube tire characterized by the cover being held extended by two hoops held apart by springs of elastic material, such as rubber, arranged crossing each other and connected to the two hoops; and it is the special object of this invention to construct and arrange these springs in such a way that two of them are combined in one piece.

The invention is illustrated in the annexed drawings, of which Figure 1 is a section through a tire. Fig. 2 shows the rubber spring $b'$. Fig. 3 shows the flat rubber piece $t$, and Figs. 4 to 7 show modifications in section and plan.

Within the tube $h$, of rubber or other pliant material, which constitutes the tire-carcass, two hoops $a$ and $c$ are placed. These hoops extend around the entire interior circumference, the one, $c$, lying within the concavity of the rim or felly $e$, and the other, $a$, slightly larger in diameter, extending internally around the tread of the tire. Both these hoops are, like the rim, curved or concave in cross-section, and they are so placed in the carcass that the convexity of the one, $a$, near the internal surface of the tread is directed toward the concavity of the one, $c$, lying in the concavity of the rim $e$.

Hereinafter the hoop $c$, lying in the rim, will be referred to as the "inner rim," and that near the internal surface of the tread will be referred to as the "outer hoop."

The inner hoop $c$ is fastened to the rim $e$ by means of bolts or screws $f$, and the outer one $a$ is held apart from it by means of a number of elastic springs $b'$, formed, preferably, of short flat pieces of rubber. The end of each piece or spring $b'$ is provided with a hook $s$, which serves for hooking it into holes provided near the ends of the outer hoop $a$. These springs $b'$ or pieces of rubber are passed under the inner hoop $c$, then crossed, and the hooks $s$ at their extremities hooked into the eyes or holes in the outer hoop.

The inner hoop $c$ has its edges curled up or bent inward to prevent them cutting the rubber springs, while the edges of the outer hoop are bent or curled outward to grip or hold the edges of a stretchable supporting-band $t$, which I am now about to describe. This supporting-band $t$, Fig. 3, consists of an endless strip of rubber or like elastic material and has hooks $u$ provided at intervals along both edges. This band $t$ is stretched around the external periphery of the outer hoop $a$ and is secured in position by fastening the hooks $u$ on its edges around the outwardly-curled edges of the outer hoop, so that it forms a "bridge," so to speak, over the concavity of the said hoop, upon the top of which bridge the internal surface $h^2$ of the tread $h$ rests. This internal surface may be of any contour, but is preferably semicylindrical—that is to say, semicircular in cross-section or following the curvature of the outer hoop. This arrangement is for the purpose of increasing the resiliency of the tire.

The thickened portion $h^2$ or tread of the tire $h$ may be either integral with the tube forming the carcass or it may be a thick band separate therefrom and inserted and secured in a circumferential recess in the carcass-tube.

Instead of the rubber band $t$ being a separate piece from the carcass-tube it may be so constructed as to take its place as well as perform its own function by extending it or making it of sufficient width to be secured direct to the rim or felly, Fig. 4, of the wheel in the one direction and in the other direction forming it into a thickened portion for a tread $h^2$, and in this latter case the internal surface of the thickened portion would of course form the bridge over the outer hoop. In this modification, as shown in Fig. 4, hooks $u'$ are arranged on the internal surface of band $t$, behind which hooks grip the edges of the outer rim $a$.

The modification shown in Fig. 5 consists therein that the spring $b'$ is formed in such a manner that it serves at the same time as a bridge over the outer rim $a$, so that one can do away with the rubber band $t$, referred to in Fig. 1. In this case the springs $b'$ are larger at the ends than in the middle part, where they are crossed, so that the ends completely cover the outer rim $a$, to the edges of which rim they are fastened by means of hooks $s'$. Hooks $s^2$ or ribs $s^3$ are provided on the inner side of $b'$, which grip behind the inwardly-curved edges of the outer rim $a$ to increase the fastening of the different parts.

In Fig. 7 is shown a further modification therein, consisting that the inner rim $c$ is fastened, together with the tire $h$, to a separate piece $y$ by means of screws $z$. In the cover-piece $y$ recesses $w$ for the spokes A are provided. The outer rim $a$ is, although larger, formed in the same manner as the inner rim $c$. The springs $b^3$ are hooked by means of hooks $s^4$ into holes in the edges of the inner rim $c$, so that the flat or middle part of the springs cover the outer rim $a$, forming the above-mentioned bridge, as a rest for the tread $h^2$.

Having now described my invention, what I claim as new, and desire to secure by Letters Patent, is—

1. In an elastic tire essentially composed of two concentric rings in connection with the ordinary rim, the combination of a number of flat rubber springs having a hook at each end passed around the under side of the inner concentric ring, the two extremities of said rubber springs after having been crossed hooked into holes provided in the sides of the outer concentric ring, a stretchable band spread over said outer concentric ring and fastened to its outwardly-curled edges by means of hooks, said stretchable band forming a resilient support for the internal surface of the tread of the outer tire-cover and said cover surrounding the two concentric rings with springs and resilient band, substantially as and for the purpose specified.

2. In an elastic tire essentially composed of two concentric rings in connection with the ordinary rim, said rings being held apart by a number of flat rubber springs passed beneath the inner concentric ring and having their extremities secured to the outer concentric ring, an outer cover resting on a stretchable band, placed over and laterally secured to the outer ring surrounding the whole and secured to the ordinary rim, the inner concentric ring shaped inwardly curved in cross-section in combination with the centrally inwardly curved outer concentric ring, said outer concentric ring being provided with holes at either side for the hooks of the springs and the edges of the outer ring curled inwardly to prevent injuring the outer cover and to receive the fastening-hooks of the stretchable band placed thereon, substantially as and for the purpose set forth.

In testimony whereof I have hereunto set my hand in presence of two subscribing witnesses.

HANS SCHNEPP.

Witnesses:
 B. SCHARPF,
 F. OBERNDORF.